United States Patent [19]

Klaile et al.

[11] 4,127,235

[45] Nov. 28, 1978

[54] PROCESS FOR PRODUCING PULVEROUS SELENIUM FROM RAW SELENIUM

[75] Inventors: Börje E. W. Klaile, Espoo; Jussi J. Käyhkö, Pori; Eino A. Rosenberg, Vanha-Ulvila, all of Finland

[73] Assignee: Outokumpu Oy, Helsinki, Finland

[21] Appl. No.: 858,268

[22] Filed: Dec. 7, 1977

[30] Foreign Application Priority Data

Dec. 20, 1977 [FI] Finland .................................. 763654

[51] Int. Cl.² ............................................. B02C 19/00
[52] U.S. Cl. .......................................... 241/1; 241/3; 241/17; 241/23; 423/510
[58] Field of Search ..................... 241/1, 3, 15, 17, 21, 241/23; 423/508, 509, 510

[56] References Cited

U.S. PATENT DOCUMENTS

| 2,111,112 | 3/1938 | Dudley ................................ 423/510 |
| 2,409,835 | 10/1946 | Clark et al. ........................ 423/510 |
| 2,413,374 | 12/1946 | Phillips et al. ..................... 423/510 |
| 2,835,561 | 5/1958 | Benz ...................................... 241/17 |
| 4,047,939 | 9/1977 | Morrison ............................ 423/509 |

*Primary Examiner*—Granville Y. Custer, Jr.
*Attorney, Agent, or Firm*—Brooks, Haidt, Haffner & Delahunty

[57] ABSTRACT

A process for producing pulverous selenium from dried raw selenium by distillation, granulating the molten distillate, dripping it into water, grinding the granules, and drying the powder, in which the drying of the raw selenium before the distillation is by spray drying, the selenium granules being ground while in the form of an aqueous slurry, and the final drying of the ground selenium slurry being again effected by spray drying.

6 Claims, No Drawings

PROCESS FOR PRODUCING PULVEROUS SELENIUM FROM RAW SELENIUM

BACKGROUND OF THE INVENTION

The present invention relates to a process for producing pulverous selenium from raw selenium by distillation, drying and grinding.

The anode slime from copper electrolysis contains considerable amounts of selenium, which can be recovered in the form of raw selenium after the removal of copper and nickel. The copper is removed first from the anode slime by leaching the slime in sulfuric acid and by blowing air through the solution to dissolve the copper, whereafter the nickel can be removed from the slime by sulfating it by means of strong sulfuric acid. The selenium is roasted from the slime as selenium dioxide gas by means of sulfuric acid at a high temperature; the gas is then reduced to elemental selenium. This raw selenium is washed and finally filtered, whereby a raw material suitable for the production of pure pulverous selenium is obtained.

The raw selenium is purified by distillation at a high temperature, and for this purpose the damp raw selenium obtained from the filter must first be dried. The molten selenium obtained from the distillation is granulated in water and must thereafter be re-dried before grinding in a ball mill.

According to a currently used process, raw selenium is purified as follows:

In order to facilitate heat drying of raw selenium, pressurized air is blown through the damp raw selenium cake in the filter. The selenium detached from the filter falls into boxes situated below. Owing to the air blast the surface of the cake is already at this stage so dry that the material produces dust when falling into the boxes, and thus selenium passes into the atmosphere of the working space. The maximum allowable concentration is 0.1 mg/m$_3$. Currently this concentration is surpassed when the filter is being emptied, and the workers must use breathing masks.

The boxes in which the raw selenium is collected from the filter are placed in a heat cabinet one on top of the other. Air is blown through the cabinet and is heated by electric resistors. At first, when the evaporation of dampness is great, the temperature remains below 100° C., but ultimately it rises to 100–110° C. The drying in the heat cabinet lasts approximately one week. Raw selenium is crystalline and resists heating without sintering.

The dried raw selenium is batched into tanks. The batching is performed by hand. It is also fed by hand into the distillation retort. During these operations, selenium dust inevitably passes into the atmosphere of the working space.

The distillation is performed at 680° C. in a retort which is heated using light naphtha. The distilled selenium is granulated from liquid to solid state by dripping it into cold water. The produced raw selenium is amorphous and hardly resists any heating without sintering.

The distilled selenium accumulates in a tank provided with a mesh bottom. This tank is inside a larger tank, through which cold, pure water is run in such a way that during the distillation the water level is high and covers the selenium accumulated on the mesh bottom. After the distillation, all of the water is let out. The raw selenium is allowed to drip overnight on the mesh bottom to facilitate the final drying in the heat cabinet.

The distilled selenium which has remained overnight on the mesh bottom is shoveled or scooped into four mesh-bottomed boxes. The boxes are placed in the heat cabinet one on top of the other. Air is blown through the cabinet, and the air is heated to some extent by means of electric resistors. The set value of the temperature is 45° C. If the temperature rises above this, the selenium granules are sintered firmly together.

The drying time in the heat cabinet approx. 24 hours, whereafter the selenium is taken into a tank to be transferred to the grinding apparatus.

The dry, granular material is fed, for grinding, into a porcelain-lined ball mill together with steel grinding balls. The necessary grinding time is 24 hours. The ground selenium is scooped, together with the balls, into the tank in which it is transported to the sieving station. When the ball mill is being emptied, the selenium is again in the form of dust-producing powder, which produces a great deal of dust, not only when the mill is being emptied but also during the operations following (when being fed into the sieve, during the sieving, and during packing), thereby causing excess concentrations in the surrounding atmosphere.

As regards the grinding, it should also be mentioned that the steel balls cause the iron content in the product to rise greatly during the grinding. This is naturally not desirable considering the purity of the product. The results of an experiment are given below:

|  | Sample % by weight Fe | |
| --- | --- | --- |
|  | A | B |
| Distilled selenium in granules | 0.003 | 0.002 |
| After grinding | 0.011 |  |
| After grinding and sieving |  | 0.010 |

The porcelain lining may also increase the amount of impurities in the product.

The sieving is performed using a rapid sieve, the mesh of the sieve being 400 mm. All of the sieved product passes a 50-mesh sieve and 80% of it passes a 100-mesh sieve.

The object of the present invention is to provide a process for the production of pulverous selenium with a higher capacity and with a smaller number of dust-producing operations than so far, the product of the process being a selenium powder which contains less iron and resists heat better without sintering than the pulverous seleniums produced by current processes. A further object is to provide a process by which the particle size of the selenium can be regulated even during the production.

SUMMARY OF THE INVENTION

In the process according to the invention, the raw selenium obtained from a filter need not first be dried to such an extent as to cause a dust problem, but the raw selenium can be slurried in water while damp and exposed to spray drying, whereafter the spray-dried raw selenium is distilled and granulated in water by known methods. Even at this stage the selenium granules are not dried, but they are ground while in the form of an aqueous slurry and are exposed to spray drying, in which case the same spray drying device can be used as for the drying of the raw selenium.

The slurry is preferably dried using an Ultra-Turrax mixer, whereby it is easy to regulate the particle size of the selenium.

The invention is described below in more detail with the aid of examples.

EXAMPLE 1

Selenium, as is its close relative sulfur, is a non-metal which does not have a hardness corresponding to that of actual metals. This is shown by the fact that selenium can be ground in a ball mill. Thus it was thought that selenium granules could be ground effectively while in the form of an aqueous slurry. An Ultra-Turrax mixer, which is used in, for example, the paint industry to homogenize thick pigment slurries, was found very effective. Its structure is explained in the brochures of the manufacturer, Janke & Kunkel Kg.

The first experimental grindings were performed on a laboratory scale using a small mixer.

The following results are from a grinding experiment. Different quantities of water were taken and 1 kg of selenium granules was added into each quantity of water. The purpose was to experiment with slurries of different thickness. Observations were made regarding temperature changes and particle size.

| Se kg | Water kg | Temperature °C before | Temperature °C after | Time min | Specific surface area $cm^2/cm^3$ | Particle size $\mu m$ |
|---|---|---|---|---|---|---|
| 1 | 1 | 20 | 30 | 3 | 2129 | 28.2 |
| 1 | 0.8 | 19 | 32 | 3 | 2922 | 20.5 |
| 1 | 0.6 | 21 | 39 | 3 | 2149 | 27.9 |
| 1 | 0.4 | 20 | 55 | 3 | — | — |

The grinding was not successful using 0.4 kg of water owing to the sintering caused by the great increase in temperature. Selenium was added at too fast a rate.

The determination of the specific surface area, and on the basis of this, the determination of the average particle size, was performed by means of Permaran. The particle size of the selenium ground in a ball mill was determined by the same method. The result was 25.4 $\mu m$, which is of the same order as that obtained using Ultra-Turrax.

EXAMPLE 2

The next step in the grinding experimentation was to obtain an industrial-scale Ultra-Turrax mixer.

A tank of approx. 200 l with a double mantle, was made for the larger mixer. Cooling could thus be effected by running cold water between the mantles.

In one experiment, 50 l of water was put into the tank. A total of 50 kg of selenium granules were added to this water in 10-kilogram batches at 10-minute intervals, while the mixer and the cooling were in operation. Disturbances did not appear. More selenium was added: 10 kg + 10 kg + 5 kg at 10-minute intervals. The total quantity of water was now 50 kg and that of selenium 75 kg. The density of the slurry was 60% solid material. After a few minutes from the last addition, all of the selenium was ground. The addition of the selenium had lasted approx. 75 min in total.

EXAMPLE 3

The next experiment was performed in other respects as in Example 2, but with double quantities. Into 100 kg of water, 20 kg + 20 kg + 20 kg + 20 kg + 20 kg + 20 kg + 10 kg of selenium was added at 10-minute intervals. Thus 150 kg of selenium was ground in approx. 75 minutes, and the density of the slurry was 60%.

In neither experiment did the temperature of the slurry rise above 35° C., when cooling water was suitably circulated, and no sintering occurred.

When investigating the selenium thus ground, it was observed that at least during the grinding it had not become crystalline, for when dried in a heat cabinet at approx. 90° C., it hardened into one lump.

EXAMPLE 4

Drying experiments were performed using the laboratory-scale spray drier, Mobile Minor, of Niro Atomizer. The slurry was atomized using a dispersion plate. Another method is to use a dispersing nozzle. Air, usually at a temperature of a few hundred degrees, is fed into that space in the dryer into which the slurry has been sprayed: The water atomized from the slurry vaporizes, whereby the temperature of the air is lowered. The gas mixture and, along with it, the dry pulverous product emerge from the drier at a temperature of approx. 100° C. The solid material is usually separated from the gas by using a cyclone and often also a dust filter. The experimental drier had only cyclone separation.

Drying experiments were performed using the following temperatures for the drying air: 175° C., 210° C., 250° C., 280° C., 300° C., 350° C.

Sintering and adhering to the walls were not observed at any temperature, but the product was obtained in the form of loose powder.

The higher the air feed temperature, the higher the evaporation capacity of the apparatus. In the trial runs there were feeding problems at all the temperatures except 350° C. since the slurry feed was so small. At a slurry density of 1 kg of selenium and 1.5 kg of water, the maximum feed rate obtained was 4 kg of selenium and 6 kg of water an hour. In industrial-scale apparatus the feed rate would be higher and the feed would be thicker. Thereby a larger quantity of dry product would be obtained for each evaporated kilogram of water.

The temperature of the outlet gas was kept at 80–90° C. by controlling the feed rate, and then the product was dry.

Successful drying experiments using a spray drier were also performed on raw selenium. In principle the feeding of slurry is easier, since the solid material is finer. The average particle size is 1.7 $\mu m$ measured by means of Permaran. There is no risk of sintering.

When selenium powder ground by means of Ultra-Turrax and dried by means of a spray drier was investigated in more detail, it was observed that it does not harden or cake when heated up to 100° C. The product obtained by the current processes, ground in a ball mill and carefully dried in a cabinet, cannot resist such heating without sintering. Thus, in spray drying the product was converted from amorphous to crystalline state, a state which does resist heating. This occurs very rapidly, for the retention time in the drier is 10–20 sec. In addition, it must occur at the time when the slurry has been atomized into the drier and the particles of material are separate from each other, so that sintering cannot occur at the moment of the conversion. Thus sintering will not occur even after the drying, when the particles have again been collected together, but their temperature is still above 50° C.

What is claimed is:

1. A process for producing pulverous selenium from raw selenium, comprising:
   spray drying the raw selenium;
   distilling the dried raw selenium;
   granulating the molten distillate by dripping it into water;
   grinding an aqueous slurry of the selenium granules;
   and finally spray drying the ground selenium slurry to produce pulverous selenium.

2. The process of claim 1, in which the selenium granules are ground while in the form of a slurry which has a density of 60% at maximum and 50% at minimum.

3. The process of claim 1, in which the selenium granules are added gradually, in the form of a slurry, during the grinding.

4. The process of claim 1, in which the slurry is cooled during the grinding thereof.

5. The process of claim 1, in which the ground slurry is spray dried with air at a temperature of approx. 175–359° C.

6. The process of claim 1, in which the ground slurry is fed into a spray drier at such a rate that the temperature of the outlet gas is approx. 80°–90° C.

* * * * *